United States Patent [19]
Stamer et al.

[11] Patent Number: 6,109,739
[45] Date of Patent: Aug. 29, 2000

[54] DOT POSITIONING FOR CONTINUOUS INK JET PRINTER

[75] Inventors: Michael Stamer, Lincolnwood; Dilip K Shrivastava, Lake Zurich, both of Ill.

[73] Assignee: Marconi Data Systems Inc, Wood Dale, Ill.

[21] Appl. No.: 09/096,641

[22] Filed: Jun. 12, 1998

[51] Int. Cl.[7] ....................................................... B41J 2/02
[52] U.S. Cl. ............................ 347/73; 347/74; 347/75; 347/76; 347/77
[58] Field of Search ................................. 347/73, 74, 75, 347/76, 77

[56] References Cited

U.S. PATENT DOCUMENTS

| | | | |
|---|---|---|---|
| 3,298,030 | 1/1967 | Lewis et al. | 346/75 |
| 4,115,787 | 9/1978 | Fujimoto et al. | 346/75 |
| 4,198,642 | 4/1980 | Gamblin | 346/41 |
| 4,216,480 | 8/1980 | Buehner et al. | 346/75 |
| 4,322,732 | 3/1982 | Furukawa et al. | 347/76 |
| 4,439,775 | 3/1984 | Johnson | 347/74 X |
| 4,472,722 | 9/1984 | Ebi | 347/76 |
| 4,613,871 | 9/1986 | Katerberg | 347/76 |
| 4,670,761 | 6/1987 | Yoshino et al. | 346/75 |
| 4,688,049 | 8/1987 | Doyle et al. | 347/76 |
| 4,845,512 | 7/1989 | Arway | 347/77 |

FOREIGN PATENT DOCUMENTS

| | | | |
|---|---|---|---|
| 0 551 763 A1 | 7/1993 | European Pat. Off. | G06K 15/02 |
| 0 690 411 AZ | 6/1995 | European Pat. Off. | |
| 0 741 041 A2 | 11/1996 | European Pat. Off. | B41J 2/205 |
| WO 93/10977 | 6/1993 | WIPO | B41J 2/075 |
| WO 97/06009 | 2/1997 | WIPO | B41J 2/085 |

Primary Examiner—John S. Hilten
Assistant Examiner—Minh H. Chau
Attorney, Agent, or Firm—Piper Marbury Rudnick & Wolfe

[57] ABSTRACT

A stroke based method for printing for use in a continuous ink jet printer. A set number of drops are assigned to a stroke, but the number of positions which can be printed on a stroke is greater than the number of drops on the stroke. This allows improved fonts at the same print speed.

20 Claims, 11 Drawing Sheets

| Sroke # | Virtual dot position | | | | | | | | | Valid? |
|---|---|---|---|---|---|---|---|---|---|---|
| | 1 | 2 | 3 | 4 | 5 | 6 | 7 | 8 | 9 | |
| 1 | 80 | 8 | 8 | 8 | 8 | 8 | 8 | 8 | 8 | Yes |
| 2 | 8 | 89 | 8 | 8 | 8 | 8 | 8 | 8 | 8 | Yes |
| 3 | 80 | 89 | 8 | 8 | 8 | 8 | 8 | 8 | 8 | No |
| 4 | 8 | 8 | 98 | 8 | 8 | 8 | 8 | 8 | 8 | Yes |
| 5 | 80 | 8 | 98 | 8 | 8 | 8 | 8 | 8 | 8 | Yes |
| 6 | 8 | 89 | 98 | 8 | 8 | 8 | 8 | 8 | 8 | No |
| 7 | 80 | 89 | 98 | 8 | 8 | 8 | 8 | 8 | 8 | No |
| 8 | 8 | 8 | 8 | 107 | 8 | 8 | 8 | 8 | 8 | Yes |
| 9 | 80 | 8 | 8 | 107 | 8 | 8 | 8 | 8 | 8 | Yes |
| 10 | 8 | 89 | 8 | 107 | 8 | 8 | 8 | 8 | 8 | Yes |
| 505 | 80 | 8 | 8 | 107 | 116 | 125 | 134 | 143 | 152 | No |
| 506 | 8 | 89 | 8 | 107 | 116 | 125 | 134 | 143 | 152 | No |
| 507 | 80 | 89 | 8 | 107 | 116 | 125 | 134 | 143 | 152 | No |
| 508 | 8 | 8 | 98 | 107 | 116 | 125 | 134 | 143 | 152 | No |
| 509 | 80 | 8 | 98 | 107 | 116 | 125 | 134 | 143 | 152 | No |
| 510 | 8 | 89 | 98 | 107 | 116 | 125 | 134 | 143 | 152 | No |
| 511 | 80 | 89 | 98 | 107 | 116 | 125 | 134 | 143 | 152 | No |

FIG 6B

| Sroke # | Virtual dot position | | | | | | | | | Valid? |
|---|---|---|---|---|---|---|---|---|---|---|
| | 1 | 2 | 3 | 4 | 5 | 6 | 7 | 8 | 9 | |
| 1 | 1 | 0 | 0 | 0 | 0 | 0 | 0 | 0 | 0 | Yes |
| 2 | 0 | 1 | 0 | 0 | 0 | 0 | 0 | 0 | 0 | Yes |
| 3 | 1 | 1 | 0 | 0 | 0 | 0 | 0 | 0 | 0 | No |
| 4 | 0 | 0 | 1 | 0 | 0 | 0 | 0 | 0 | 0 | Yes |
| 5 | 1 | 0 | 1 | 0 | 0 | 0 | 0 | 0 | 0 | Yes |
| 6 | 0 | 1 | 1 | 0 | 0 | 0 | 0 | 0 | 0 | No |
| 7 | 1 | 1 | 1 | 0 | 0 | 0 | 0 | 0 | 0 | No |
| 8 | 0 | 0 | 0 | 1 | 0 | 0 | 0 | 0 | 0 | Yes |
| 9 | 1 | 0 | 0 | 1 | 0 | 0 | 0 | 0 | 0 | Yes |
| 10 | 0 | 1 | 0 | 1 | 0 | 0 | 0 | 0 | 0 | Yes |
| 505 | 1 | 0 | 0 | 1 | 1 | 1 | 1 | 1 | 1 | No |
| 506 | 0 | 1 | 0 | 1 | 1 | 1 | 1 | 1 | 1 | No |
| 507 | 1 | 1 | 0 | 1 | 1 | 1 | 1 | 1 | 1 | No |
| 508 | 0 | 0 | 1 | 1 | 1 | 1 | 1 | 1 | 1 | No |
| 509 | 1 | 0 | 1 | 1 | 1 | 1 | 1 | 1 | 1 | No |
| 510 | 0 | 1 | 1 | 1 | 1 | 1 | 1 | 1 | 1 | No |
| 511 | 1 | 1 | 1 | 1 | 1 | 1 | 1 | 1 | 1 | No |

FIG. 7A

PERMITTED STROKES (5 X7)

FIG. 7B

PROHIBITED STROKES (5 X7)

FIG 8

| Font | No. of strokes | No. of strokes with virtual stroke N=2n-1 | Allowable strokes with virtual stroke N=2n-1 |
|---|---|---|---|
| 5x5SL | 31 | 511 | 88 |
| 5X7SL | 127 | 8191 | 609 |
| 7x9SL | 511 | 131071 | 4180 |

FIG 9

| Sroke # | Drop No. | | | | |
|---|---|---|---|---|---|
| | 1 | 2 | 3 | 4 | 5 |
| 1 | 80 | 8 | 8 | 8 | 8 |
| 2 | 89 | 8 | 8 | 8 | 8 |
| 4 | 8 | 98 | 8 | 8 | 8 |
| 5 | 80 | 98 | 8 | 8 | 8 |
| 8 | 8 | 107 | 8 | 8 | 8 |
| 9 | 80 | 107 | 8 | 8 | 8 |
| 10 | 89 | 107 | 8 | 8 | 8 |
| ... | ... | ... | ... | ... | ... |
| 330 | 89 | 107 | 8 | 134 | 152 |
| 336 | 8 | 8 | 116 | 134 | 152 |
| 337 | 80 | 8 | 116 | 134 | 152 |
| 338 | 89 | 8 | 116 | 134 | 152 |
| 340 | 8 | 98 | 116 | 134 | 152 |
| 341 | 80 | 98 | 116 | 134 | 152 |

FIG 10

| Sroke # | Drop No. | | | | |
|---|---|---|---|---|---|
| | 1 | 2 | 3 | 4 | 5 |
| 1 | 79 | 8 | 8 | 8 | 8 |
| 2 | 89 | 8 | 8 | 8 | 8 |
| 4 | 8 | 98 | 8 | 8 | 8 |
| 5 | 80 | 109 | 8 | 8 | 8 |
| 8 | 8 | 107 | 8 | 8 | 8 |
| 9 | 80 | 118 | 8 | 8 | 8 |
| 10 | 89 | 120 | 8 | 8 | 8 |
| 330 | 90 | 121 | 8 | 139 | 170 |
| 336 | 8 | 8 | 118 | 153 | 171 |
| 337 | 80 | 8 | 120 | 153 | 172 |
| 338 | 90 | 8 | 121 | 153 | 172 |
| 340 | 8 | 99 | 132 | 154 | 172 |
| 341 | 80 | 112 | 134 | 155 | 172 |

FIG 11

| Sroke # | Drop No. | | | | | Dummy? |
|---|---|---|---|---|---|---|
| | 1 | 2 | 3 | 4 | 5 | |
| 1 | 8 | 8 | 8 | 8 | 8 | |
| 2 | 89 | 8 | 8 | 8 | 8 | |
| 3 | 80 | 8 | 8 | 8 | 8 | Dummy |
| 4 | 8 | 98 | 8 | 8 | 8 | |
| 5 | 80 | 109 | 8 | 8 | 8 | |
| 6 | 90 | 100 | 8 | 8 | 8 | Dummy |
| 7 | 80 | 100 | 8 | 8 | 8 | Dummy |
| 8 | 8 | 107 | 8 | 8 | 8 | |
| 9 | 80 | 118 | 8 | 8 | 8 | |
| 10 | 89 | 120 | 8 | 8 | 8 | |
| ... | ... | ... | ... | ... | ... | |
| 330 | 90 | 121 | 8 | 139 | 170 | |
| 331 | 80 | 110 | 8 | 140 | 160 | Dummy |
| 332 | 8 | 100 | 8 | 140 | 160 | Dummy |
| 333 | 80 | 100 | 8 | 140 | 160 | Dummy |
| 334 | 90 | 100 | 8 | 140 | 160 | Dummy |
| 335 | 80 | 100 | 8 | 140 | 160 | Dummy |
| 336 | 8 | 8 | 118 | 153 | 171 | |
| 337 | 80 | 8 | 120 | 153 | 172 | |
| 338 | 90 | 8 | 121 | 153 | 172 | |
| 339 | 80 | 8 | 120 | 140 | 160 | Dummy |
| 340 | 8 | 99 | 132 | 154 | 172 | |
| 341 | 80 | 112 | 134 | 155 | 172 | |
| ... | ... | ... | ... | ... | ... | |
| 500 | 8 | 100 | 120 | 140 | 160 | Dummy |
| 501 | 80 | 100 | 120 | 140 | 160 | Dummy |
| 502 | 90 | 100 | 120 | 140 | 160 | Dummy |
| 503 | 80 | 100 | 120 | 140 | 160 | Dummy |
| 504 | 8 | 110 | 120 | 140 | 160 | Dummy |
| 505 | 80 | 110 | 120 | 140 | 160 | Dummy |
| 506 | 90 | 110 | 120 | 140 | 160 | Dummy |
| 507 | 80 | 110 | 120 | 140 | 160 | Dummy |
| 508 | 8 | 100 | 120 | 140 | 160 | Dummy |
| 509 | 80 | 100 | 120 | 140 | 160 | Dummy |
| 510 | 90 | 100 | 120 | 140 | 160 | Dummy |
| 511 | 80 | 100 | 120 | 140 | 160 | Dummy |

DOT POSITIONING FOR CONTINUOUS INK JET PRINTER

BACKGROUND OF THE INVENTION

The present invention relates to ink jet printing, and in particular to an improved method for positioning dots produced by a continuous ink jet printer.

Figure 1:
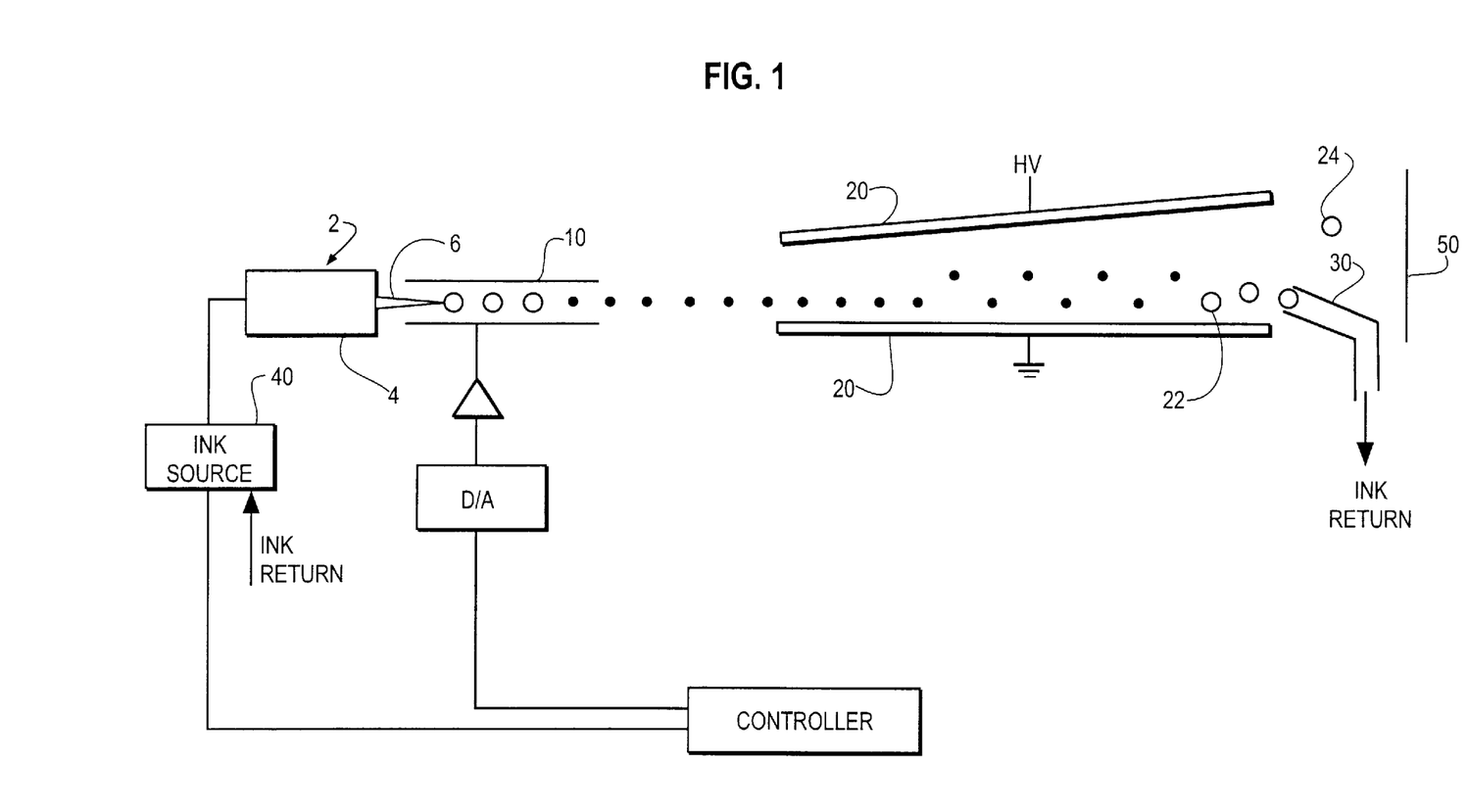
FIG. 1 shows the operation of a typical continuous ink jet printer.

Continuous ink jet printers are well known in the field of industrial coding and marking, and are widely used for printing information, such as expiry dates, on various types of substrate passing the printer on production lines. As shown in FIG. 1, a jet of ink is broken up into a regular stream of uniform ink drops by an oscillating piezoelectric element. The drops then pass a charging plate which charges individual drops at a selected voltage. The drops then pass through a transverse electric field provided across a pair of deflection plates. Each drop is deflected by an amount which depends on its charge. If the drop is uncharged, it will pass through the deflection plates without deflection. Uncharged and slightly charged drops are collected in a catcher and returned to the ink supply for reuse. A drop following a trajectory that misses the catcher will impinge on the substrate at a point along a line determined by the charge on the drop. Often, each charged drop is interspersed by a guard drop with substantially no charge to decrease electrostatic and aerodynamic interaction between charged drops. As the substrate is moving past the printer, the placement of the drop on the substrate in the direction of motion of the substrate will have a component determined by the time at which the drop is released. The direction of motion of the substrate will hereinafter be referred to as the horizontal direction, and the direction perpendicular to this, in the plane of the substrate will hereinafter be referred to as the vertical direction. These directions are unrelated to the orientation of the substrate and printer in space. If the drops are deflected vertically, the placement of a drop in the vertical and horizontal direction is determined both by the charge on the drop and the position of the substrate.

Figure 2A:
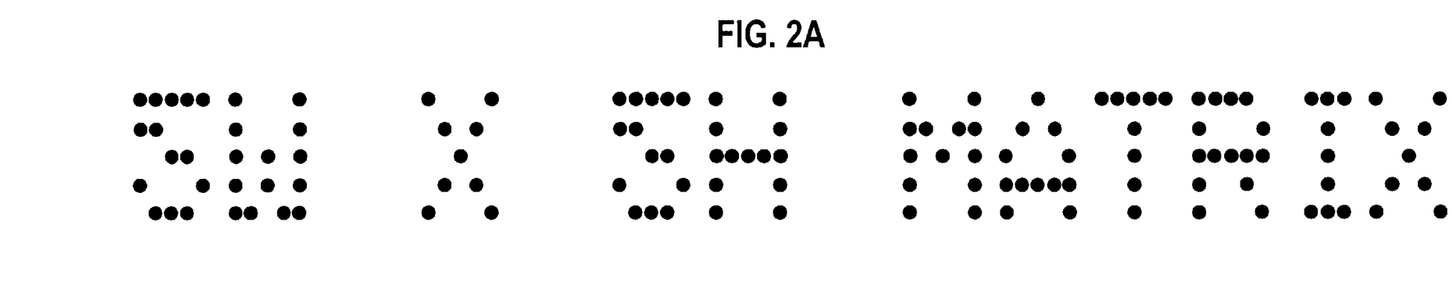
FIG. 2A illustrates characters from a standard 5×5 font used by known continuous ink jet printers.

It is general practice to provide predefined raster patterns, with the matrix for each pattern, customarily representing a character, of a predetermined size. For example, a 5 high by 5 wide matrix representing an image, as shown in FIG. 2A, can be created which represents a whole image such as a character or a portion of an image. A technique for printing these characters or portions of images which has become widely used is disclosed in U.S. Pat. No. 3,298,030 (Lewis et al). A stroke is defined for each column of the matrix and represents a slice of the image. Each usable drop is assigned to each pixel (dot position) in the stroke. If the pixel is a blank pixel, then the drop is not charged and is captured by the catcher to be sent back to the ink supply. If the pixel is to be printed, an appropriate charge is put on the drop so that it is deflected to follow a trajectory that intercepts the substrate at the appropriate position in the column for that stroke. This cycle repeats for all strokes in a character and then starts again for the next character. If the drops are deflected transversely to the direction of travel of the substrate, a set of drops forming a stroke will clearly lie along a diagonal line, as the substrate will move a certain distance between each drop in the stroke. The angular deviation of the line from vertical will increase with the speed of the substrate relative to the drop emission rate. This angular deviation can be counteracted by angling the deflection plates away from the vertical direction by an amount dependent on the expected speed of the substrate. If drops in a stroke are not sequentially allocated to equally spaced positions on the substrate, the points will no longer lie along a straight line. In order to maintain a simple matrix raster pattern, with straight lines in any direction in the matrix mapping onto straight lines on the substrate, it is necessary to print drops in a stroke sequentially with an equal time interval between each stroke. A stroke takes the same time whether it contains one printed drop or five printed drops. Generally, a varying number of extra guard drops are used at the end of each stroke to permit variation in the substrate speed on a stroke by stroke basis.

It is possible to move away from printing characters based on an orthogonal matrix and instead treat each drop individually, deflecting it using a defined range of charge values. Printing on an orthogonal grid is still possible by selecting the charges in the same sequence as in the stroke based method. This is the approach adopted in International Patent Publication WO 97/06009 (Domino Printing Sciences, PLC). However, this technique makes it much more complicated to generate a font, as it becomes more difficult to determine allowable dot positions. Furthermore, for such a system to be useful, the printhead must be angled at $\tan^{-1}[(I+1)/n]$ where I is the number of guard drops and n is the number of dots in a column if a standard orthogonal matrix is desired. In normal printing, this will always be at least $\tan^{-1}(2/n)$. This leads to significant distortion if the print substrate accelerates, as, for any particular print speed, the time between successive drops in any particular column is at least doubled.

Figure 2B:
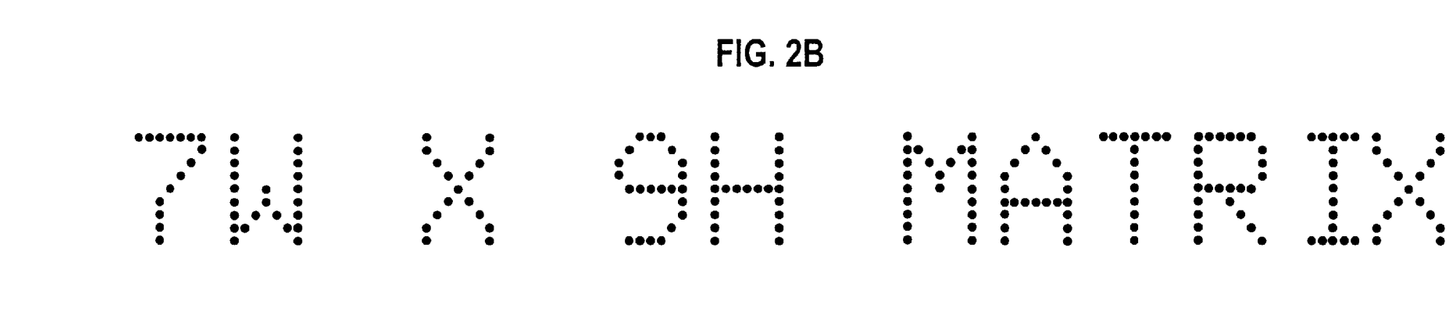
FIG. 2B illustrates characters from a standard 7×9 font used by known continuous ink jet printers.

It is well known that character definition improves with more dot positions in a vertical stroke and more strokes per character. FIGS. 2A and 2B respectively show characters based on 5×5 and 7×9 matrices. The 7×9 matrix clearly yields better defined characters. However, for a constant drop rate determined by the limitations of the hardware, in order to be able to print at all pixel locations in the matrix, the maximum substrate speed will have to be inversely proportional to the number of pixels per character. Thus, character definition cannot be improved without reducing the maximum substrate speed. The smaller the matrix, the faster the speed but the characters become less defined. There is a conflicting need for better defined fonts at higher speeds, which are still formed from a simple orthogonal matrix.

An approach which has been used to improve character definition while maintaining the same stroke rate is described in U.S. Pat. No. 4,631,557 (Fujimoto et al.). While dots are generally printed along a conventional stroke, each dot can optionally be vertically deflected to a different location approximately half a stroke height away. At this time, the printhead will have moved approximately half a stroke width in the direction of travel of the substrate relative to a dot on the previous stroke at the same vertical position. This therefore gives a way of printing dots along a "virtual" stroke horizontally between two successive conventional strokes. A significant disadvantage of this technique is that varying the number of guard drops between strokes will have a significant effect on the continuity of the dots in an interpolated stroke. A further disadvantage of this technique is that it is very difficult to establish allowable dot patterns in a font, as there are two allowable dot positions for any particular drop which are substantially separated on the grid of allowable dot positions.

SUMMARY OF THE INVENTION

The present invention provides a method for printing better defined characters at higher speeds, by providing an array comprising N positions vertically while only allowing pixels to be present in n positions in any one column in the array, where n is less than N. A definition associated with a matrix of height N is therefore provided, while allowing print speeds associated with a matrix of height n. By suitable selection of the N positions used in each stroke, in many cases, characters identical to those associated with a column height of N can be produced.

Advantageously, N can be chosen with value n+i(n−1) where i is an integer greater than or equal to 1, so that a regularly spaced array of n drops can be formed over the whole vertical range of the matrix. For example, if n=5, N=9 would be an appropriate value for N. Five equispaced dots can be printed at drop positions 1, 3, 5, 7, 9.

Selecting N=2n−1 particularly advantageous, as it allows a very simple mapping from the positions in a column to the drops in the associated stroke. It also gives the minimum matrix with twice the resolution and height equal to the original character height for an n high matrix.

Alternatively, selecting N=2n can be applied similarly to the 2n−1 case. The difference is that all drops in the n drop stroke may be uniformly considered to have two alternative print positions, an upper and lower position. The resulting font can be identical to the 2n−1 case for upper case characters, but also allows added refinement to lower case characters with descenders. This would include lower case g, j, p and q. The baseline of the descender characters will not be forced upward as much as before. This adds another enhancement to the font style.

The adding of descenders can be extended another drop position or two to give a more fully formed look. In this case, one aspect changes over the previous examples. For the case of a 7 drop character (n=7) adding a 2-drop descender brings the total double resolution matrix height N to 17 or 18 depending on whether the 2 positions per drop plan or the minimum matrix plan is used. In this example, the ratio of N to n is 17:7 or 18:7. This is no longer a 2:1 ratio, yet the planned resolution increase is exactly 2:1. The result is still improved high speed printing including upper and lower case characters with no penalty of speed reduction over the conventional 7 high matrix. The only side effect of extending the matrix beyond n high would be to potentially cause the raster line for certain strokes to deviate from a straight line. This would occur if the selected print drops in the stroke spanned further than n positions or are scanned in a non-uniform sequence. Depending on the appearance desired, this may or may not be of any consequence.

Furthermore, the uniformity of a refined matrix may be extended to a larger matrix area of height N which encompasses multi-line text or an image or logo area as well. Here N has the same meaning but relative to a larger overall print image matrix than just a single font height. Likewise, an allowed total number of print drops n would be defined for the total stroke. In this enlarged matrix, any font defined as above can be placed anywhere within this larger grid. Each line of text (characters) provides the improved appearance discussed. Of course, the overall speed limit is reduced by increasing the total matrix height. As before, it is determined by the total number of planned drop times n in the now multi-line stroke.

An example of this expanded matrix follows. Consider a planned print image area to consist of twelve drop positions (n=12), with N=24. Also include a planned 5 drop high font with two alternative positions per drop. Then two such lines of text characters can be arranged one over the other within the overall N high matrix to form a "twin line" printed message with from 1 to 4 "grid" positions blank between the two lines of text characters. Now consider the inclusion of a graphical image, perhaps a company logo or other stylized image or even a very large additional font, up to 12 printed drops tall. This could be arranged along side of the twin line portion of the printed image, all of this rasterized and printed as the substrate moves past the print head.

In all cases, that is, for any matrix size whether a single font or complex image, the concept of strokes is retained. The reason for this is to allow simple control of print speed as the substrate speed varies. The triggering of stroke print events is timed so as to track substrate speed. The drop sequence within a stroke is the same, though the exact compensated charge voltage values may vary slightly as drops of one stroke get closer to a preceding or subsequent stroke as speed increases.

DETAILED DESCRIPTION OF THE INVENTION

According to a specific embodiment of the present invention, a continuous ink jet printer is provided of a type shown in FIG. 1. Such printers are well known in the art, and are discussed above. The printer 1 comprises a printhead 2 with a drop generator 4 which receives ink from an ink source 40. The drop generator incorporates a piezoelectric oscillator which creates perturbations in the ink flow at a nozzle 6. Regular sized and spaced drops are accordingly emitted from the orifice. The drops pass through a charging tunnel 10, where a different charge can be applied to each drop. This charge determines the degree of deflection as the drop passes between a pair of deflection plates 20 between which a substantially constant electric field is maintained. Uncharged, or very slightly charged drops 22 pass substantially undeflected to a catcher 30, and are recycled to ink supply 40. Charged drops 24 are projected toward a substrate 50 and are deflected so as to have a trajectory striking the latter which moves past the printhead.

If a character has dimensions m x n, assuming that the horizontal and vertical dot pitches are the same, and that equivalent drops in subsequent strokes are n printable drops apart, the following equation defines the horizontal distance between two equivalent printed dots on successive strokes:

$$x = vnt_p \tag{1}$$

where $t_p$ is the time between successive printable drops and v is the velocity of the substrate. The width of a character is xm, and therefore the number of characters c per unit distance is:

$$c = \frac{1}{xm} \tag{2}$$

and so $$c = \frac{1}{nmvt_p} \tag{3}$$

For a given $t_p$ and c, the relationship between m, n and v is therefore as follows:

$$v \propto \frac{1}{m \times n} \tag{4}$$

Thus, the number of dots per character is limited by the desired speed of the substrate.

The characters "5W×5H MATRIX" printed in a font with n=5 and m=5 (ie 5×5), are shown in FIG. 2A.

With a 7×9 matrix, substantially better characters (or image definition) can be generated than with a 5×5 matrix, as shown in FIG. 2B, but with all other factors constant, the speed of the substrate has to be decreased by a factor of approximately 25/63, ie a 60% decrease in speed.

According to the present invention, a value of N, where N>n, is selected as the number of dot positions in each column of the matrix on which a character can be formed. These dot positions will normally be equispaced along the column, but the invention will work equally well if the positions are not equispaced. In each column of a font generated according to the invention, n or less of these positions are used to represent a dot in a font.

Figure 3A:
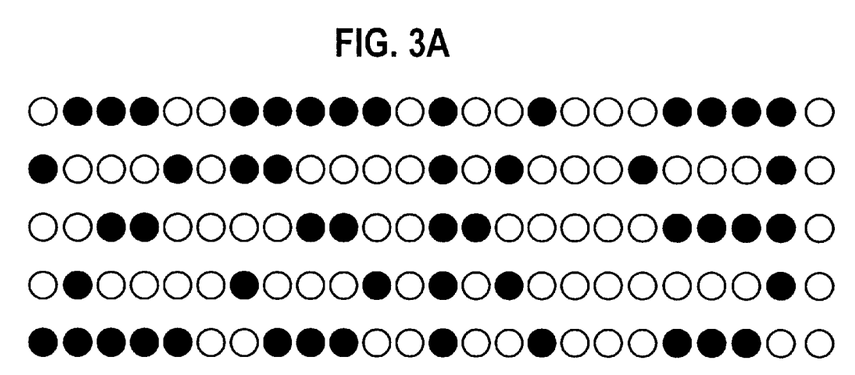
FIG. 3A shows further examples of characters from a standard 5×5 font used by known continuous ink jet printers.
Figure 3B:
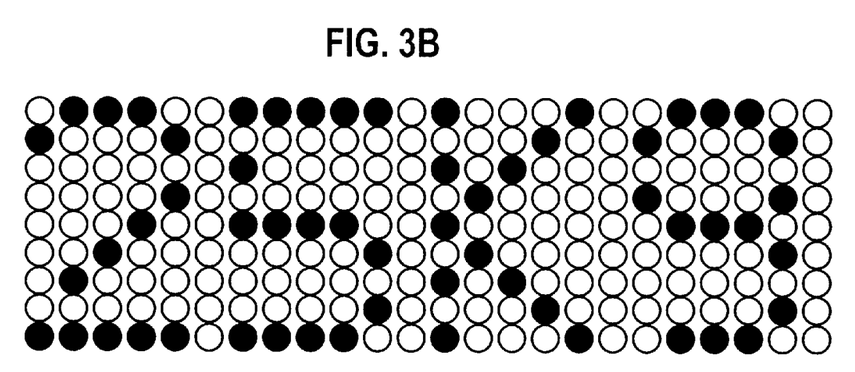
FIG. 3B shows examples of the same characters shown in FIG. 3A in a 5×5 font of the present invention using 9 virtual vertical positions in each column.

Each of the n or less dots used in a column are printed by appropriately charging the n drops comprising a stroke. Thus, the printer can still operate at a speed associated with a font of size m×n, as the same number of drops are allocated to each character as would be allocated for an m×n font, but the printer can print fonts of size m×N. FIGS. 3A and 3B show examples of characters of a normal 5×5 font and equivalent characters from a font in which n=5 and N=9 respectively. As can be seen from these figures, such a printing system gives substantially increased resolution. However, as only n positions in each column can be used, not all N×m characters can be printed.

Figure 4:
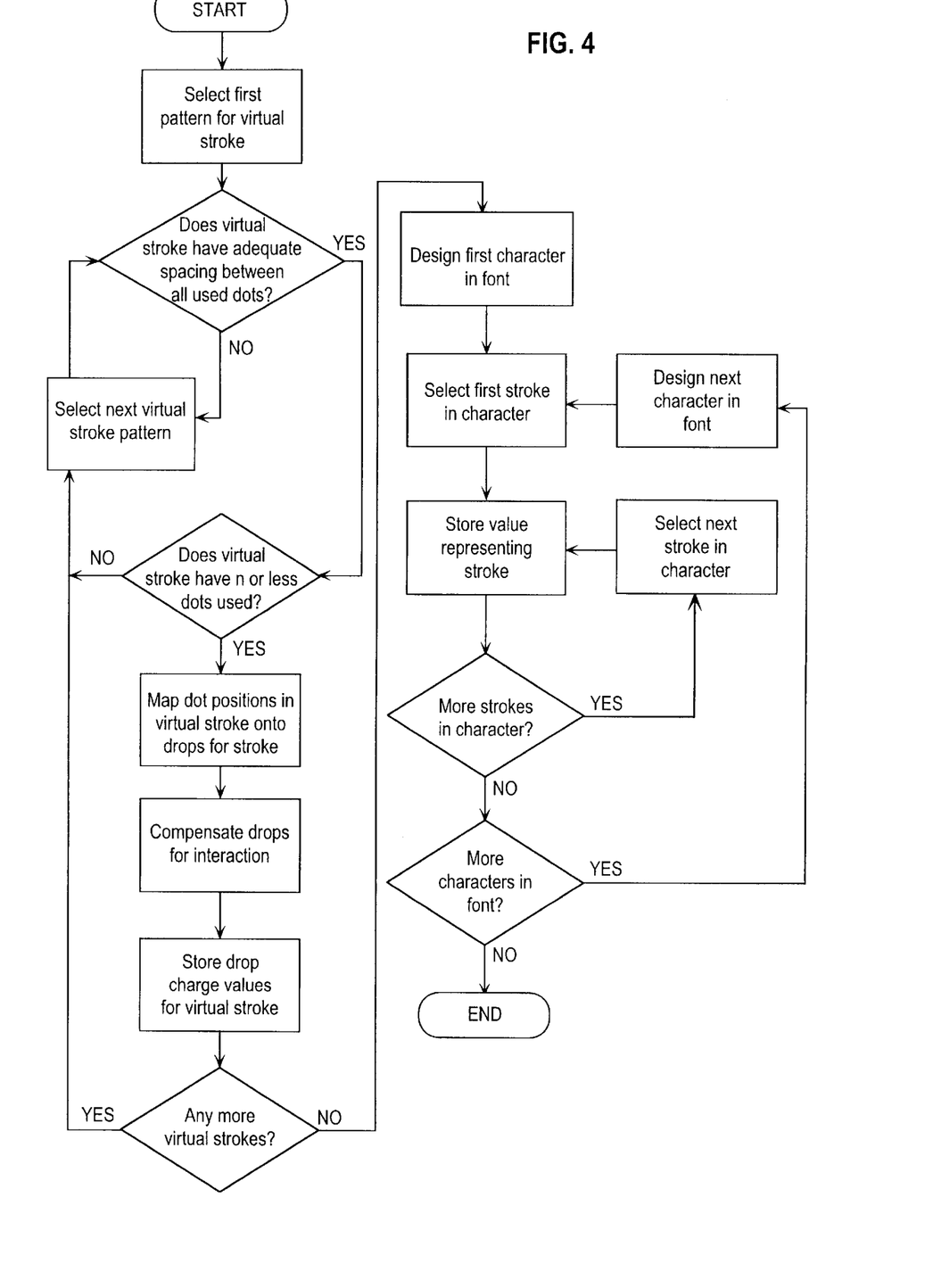
FIG. 4 is a flow chart showing how fonts according to a specific embodiment of the present invention are created and stored.
Figure 5:
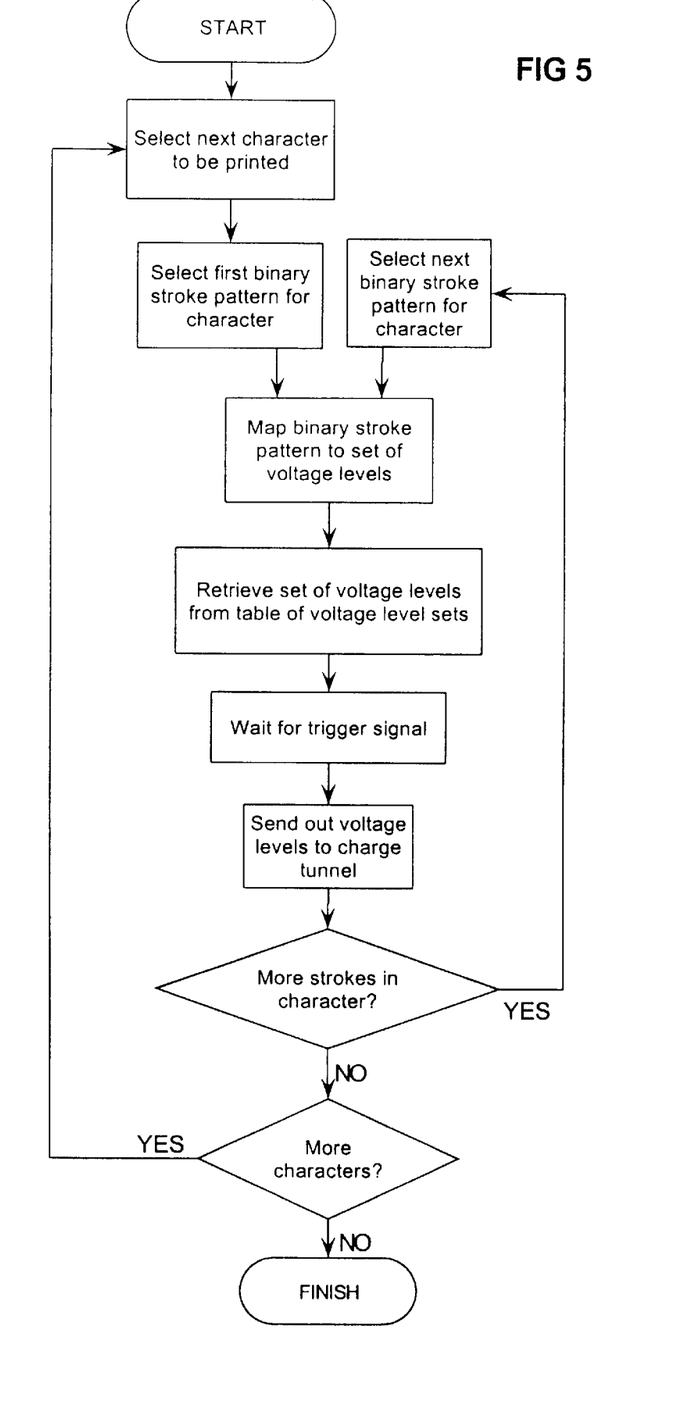
FIG. 5 is a flow chart showing how printing is performed in accordance with a specific embodiment of the present invention.

A system for generating and printing using such a font according to a specific embodiment of the invention is represented in FIGS. 4 and 5 respectively. These are flowcharts showing how the information needed is created and how printing operates, respectively.

While the discussion below applies equally to any value N>n, N would normally be selected from the set of values:

$$N = n + i(n-1) \tag{5}$$

where i is a positive integer. With a virtual column size in accordance with this formula, n points can be equally spaced over the whole range of N positions. This allows a uniform, solid font to be used over the complete range of printable positions, which would normally be desirable for printing, for example, vertical lines.

There is a practical limitation on which of the possible positions in a stroke can be used for printing, in that any two charged drops have an electrostatic force given by the well known relation:

$$F \propto \frac{q1 \times q2}{r^2} \tag{6}$$

where q1 and q2 are the electrostatic charges on the two drops, r is the distance between the centers of the two drops and F is the electrostatic force between drops referred to as "drop interaction". Clearly, the farther apart the drops travel in flight, the less the electrostatic repulsive force between the drops. However, to form adjacent dots closer together on the substrate, the drops must also travel in flight closer together. That increases electrostatic interaction. As the drop interaction increases, it becomes more difficult to control the path of drops and poor print quality results. Similar undesirable interaction effects are caused by aerodynamic factors which compound the problem further. This might add a restriction to how close two consecutive dots in a column can be printed. Proximity of dots might also be limited to prevent undesired drop interaction on the substrate due to drop overlap.

Thus, while increasing the number of positions in the vertical direction to N, there must be provision for maintaining a minimum spacing between dots. This can easily be achieved by creating a rule that there must be a certain predetermined number of unused points in a column between two consecutive used points. This rule is checked when storing a stroke, as shown in FIG. 4.

Furthermore, it is advantageous for the ratio of the temporal and distance spacing along the length of the stroke to be as close to constant as possible, so that dots in all strokes in a character appear in parallel straight lines, increasing the legibility of the characters. For example, if dots are only required at the top and the bottom of a stroke, it is advantageous to leave a temporal gap between these dots equivalent to the length of time it would have taken to print dots in all the available intervening positions, so that the dots lie on a fairly regular array on the substrate.

Each of the allowable N high strokes generated then need to be mapped to the n high matrix, as shown in FIG. 4. Ideally, the distal spacing between dots in the N high strokes will be mapped as closely as possible to equivalently temporally spaced drops, so as to keep strokes lying along a reasonably straight line, as discussed above. For example, if N=2n−1 and two consecutive locations in the N high matrix cannot be used, locations 2k and 2k−1 in the N high stroke can be mapped to drop k when these values are in the range 1 . . . N.

For each allowable arrangement of dots in a column, once the used dots to be used have been mapped onto a stroke of drops, the charges to be applied to the drops to compensate for the electrostatic and aerodynamic effects discussed above are calculated, as shown in FIG. 4. Mathematical algorithms or empirical means for achieving this compensation are well known and are not discussed here. The set of compensated drop charges for each allowable stroke is stored in a table in memory. For every character in a font which is to be printed, a stroke identifier value is stored in memory representing each stroke in the character, as also shown in FIG. 4. Stroke identifiers for valid strokes could be sequential values, or the identifier could simply be a binary representation of the N high stroke. However, it is not difficult for someone skilled in the art to develop special windowing techniques when the matrix gets large or when multi-line fonts and graphics images are used.

Once the characters and compensated drop values are stored in memory, the printer operates as shown in the flowchart shown in FIG. 5.

For every character which is to be printed, the stroke identifiers representing the strokes are read from memory sequentially. For each stroke, a set of compensated drop charges is read from the memory based on the stroke identifier. These charges are sequentially applied to the droplet charging plates to appropriately charge the drops in a stroke.

An example of a charging technique for printing at 5 drops per stroke and 5 strokes per character using a virtual font of size 5×9 (ie n=5, N=9) will now be discussed as a specific, non-limiting example. Consider,for example the first stroke in the character "5" shown in FIGS. 3A and 3B.

In a conventional 5×5 continuous ink jet printing implementation, voltages for each position in the column are first chosen by experiment. In this example, the voltage for the lowest position is 80V and the voltage for the top position is 152V. Assuming a linear ramp, the five print positions would require stroke voltages of:

| 5 × 5 Uncompensated Positions | | | | | |
| --- | --- | --- | --- | --- | --- |
| Position | 1 | 2 | 3 | 4 | 5 |
| Voltage | 80 | 98 | 116 | 134 | 152 |

Using these values, a table of values is created which has all possible binary combinations. In this case, there would be $2^5-1$, or 31 strokes if a blank stroke is not included. For example, the first stroke for the character "5" would be represented as follows:

| 5 × 5 Uncompensated Example Stroke | | | | | |
| --- | --- | --- | --- | --- | --- |
| Position | 1 | 2 | 3 | 4 | 5 |
| Voltage | 8 | 98 | 8 | 134 | 152 |

In high speed printing, where every drop can be a print drop, there is heavy interaction between drops as described above, and an analytical solution is extremely difficult, if not impossible, to calculate. The compensated charge voltages are then experimentally determined and they could for example consist of the following values:

| 5 × 5 Compensated Example Stroke | | | | | |
| --- | --- | --- | --- | --- | --- |
| Position | 1 | 2 | 3 | 4 | 5 |
| Voltage | 8 | 98 | 8 | 135 | 164 |

According to the present invention, in the specific example where N=9, the uncompensated theoretical stroke is as follows:

| 5 × 9 Uncompensated Positions | | | | | | | | | |
| --- | --- | --- | --- | --- | --- | --- | --- | --- | --- |
| Position | 1 | 2 | 3 | 4 | 5 | 6 | 7 | 8 | 9 |
| Voltage | 80 | 89 | 98 | 107 | 116 | 125 | 134 | 143 | 152 |

Figure 6A:
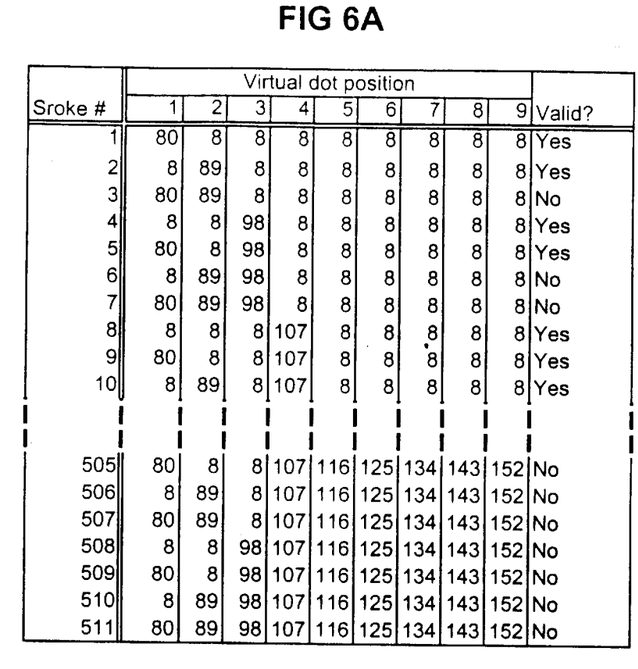
FIG. 6A is a table showing selected sets of uncompensated valid and invalid dot positions according to an example of the specific embodiment of the invention.
Figure 6B:
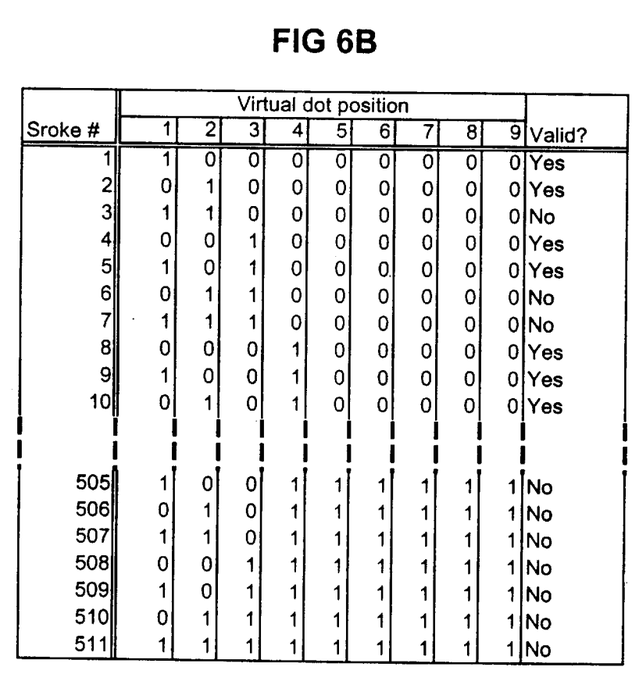
FIG. 6B is a table showing the binary equivalent of the voltage table in FIG. 6A.

It should be noted that the half steps are separated by 9V when the full strokes were separated by 18V. If all of the combinations of dot positions were allowed, there would be 511 ($2^9-1$) possible strokes, not including a blank stroke. Some of these theoretical strokes are shown in FIG. 6A, and the dot positions associated with these theoretical strokes are shown in FIG. 6B.

Figure 7A:
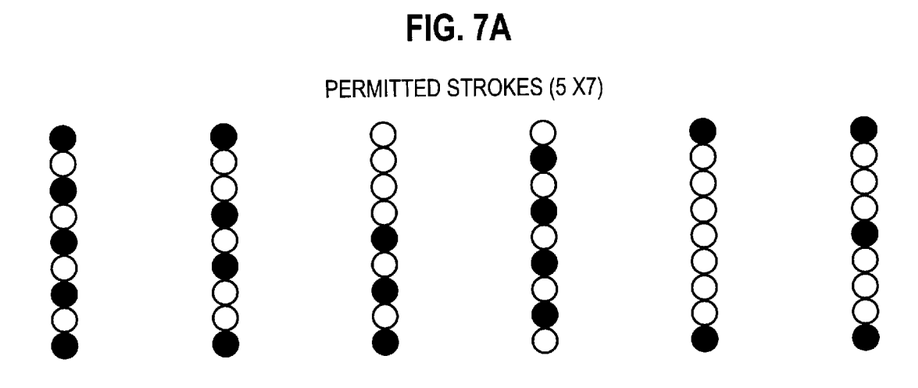
FIG. 7A shows examples of allowable column pixel arrangements for the strokes of the example of the specific embodiment.
Figure 7B:
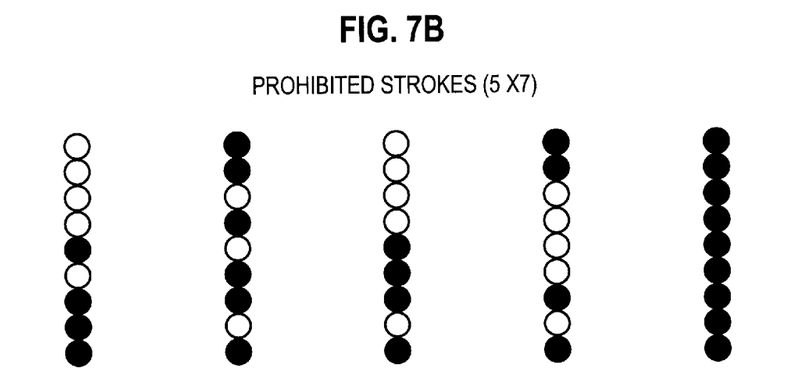
FIG. 7B shows examples of column pixel arrangements which are not allowable for the strokes of the example of the specific embodiment.

However, in this specific example, due to electrostatic and aerodynamic interactions between drops the minimum spacing between dots is two. Thus, the arrangements shown in FIG. 7A are acceptable, but the arrangements shown in FIG. 7B are not permitted because they have dots in consecutive locations. Such strokes are identified as invalid and cannot be used. The example then simplifies into 88 allowable strokes, not including a blank stroke. For example, the theoretical stroke of the first column of the character "5" shown in FIG. 3B would be:

| 5 × 9 Uncompensated Example Stroke | | | | | | | | | |
| --- | --- | --- | --- | --- | --- | --- | --- | --- | --- |
| Position | 1 | 2 | 3 | 4 | 5 | 6 | 7 | 8 | 9 |
| Voltage | 80 | 8 | 8 | 8 | 116 | 8 | 134 | 8 | 152 |

Figure 8:
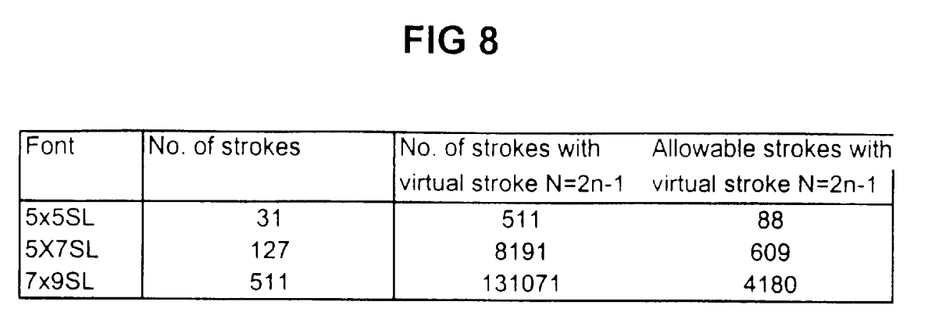
FIG. 8 is a table showing the number of strokes allowable for different sized fonts.

For reference, FIG. 8 shows the number of different strokes for three different font sizes. The first column shows the number of strokes for a font in its normal form. The second column shows the number of possible strokes of size N=2n−1. The third column shows the actual number of strokes with virtual stroke size N=2n−1 with the limitation that the number of drops used must be less than or equal to n and two consecutive virtual dot positions cannot be used. These strokes need to be mapped onto the n available drops for printing that stroke.

A general method for performing this mapping was discussed above. In the present example, where N=2n−1 and the virtual stroke is uniformly spaced, the mappings can be calculated as discussed above. That is to say, odd numbered virtual positions 2i−1 and even numbered positions 2i, where i is a positive integer are mapped onto printable drop i. For example, virtual dots 3 and 4 are both mapped onto printable drop 2. As both of these virtual dots can never both be used on a single stroke, there will never be any contention over which virtual dot uses which drop. It is straightforward to show that this mapping will always produce the closest approximation to a set of parallel straight lines for each of the columns.

Figure 9:
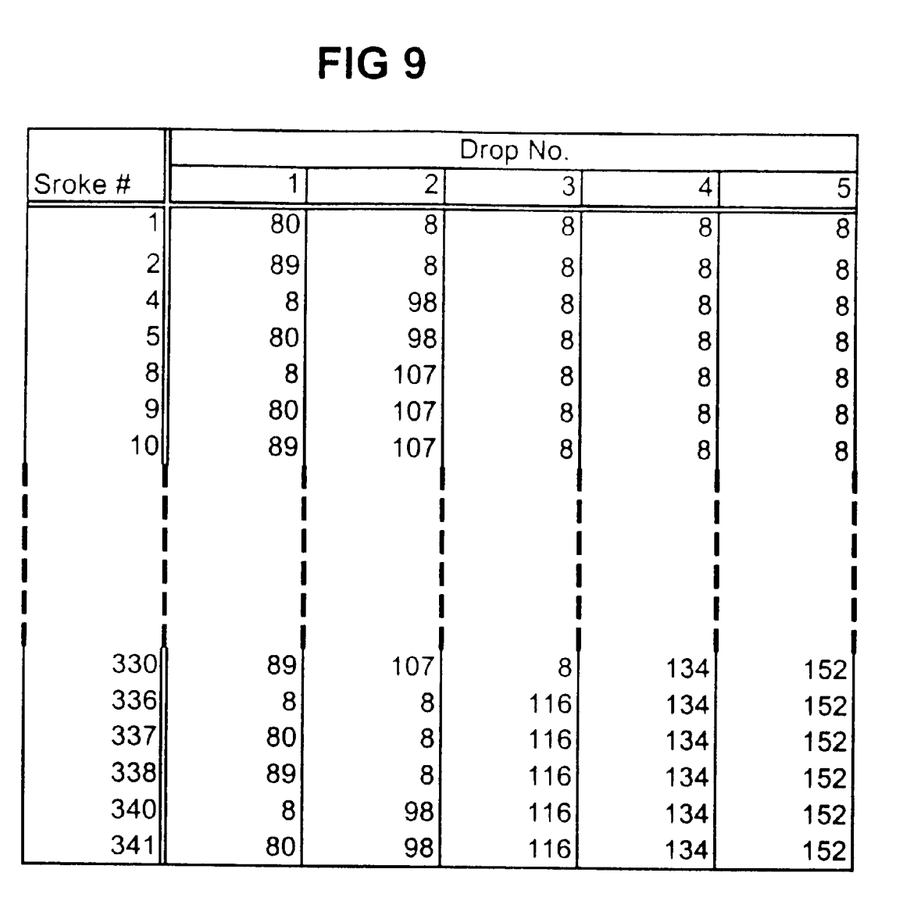
FIG. 9 is a table showing the dot positions of FIG. 6 mapped onto the available droplets.

Using this specific mapping, a table of uncompensated strokes can be calculated. The first 6 and the last 5 allowable strokes are shown in FIG. 9. In this example, the uncompensated stroke is as follows:

| 5 × 9 Mapped but uncompensated Example Stroke | | | | | |
| --- | --- | --- | --- | --- | --- |
| Position | 1 | 2 | 3 | 4 | 5 |
| Voltage | 80 | 8 | 116 | 134 | 152 |

Figure 10:
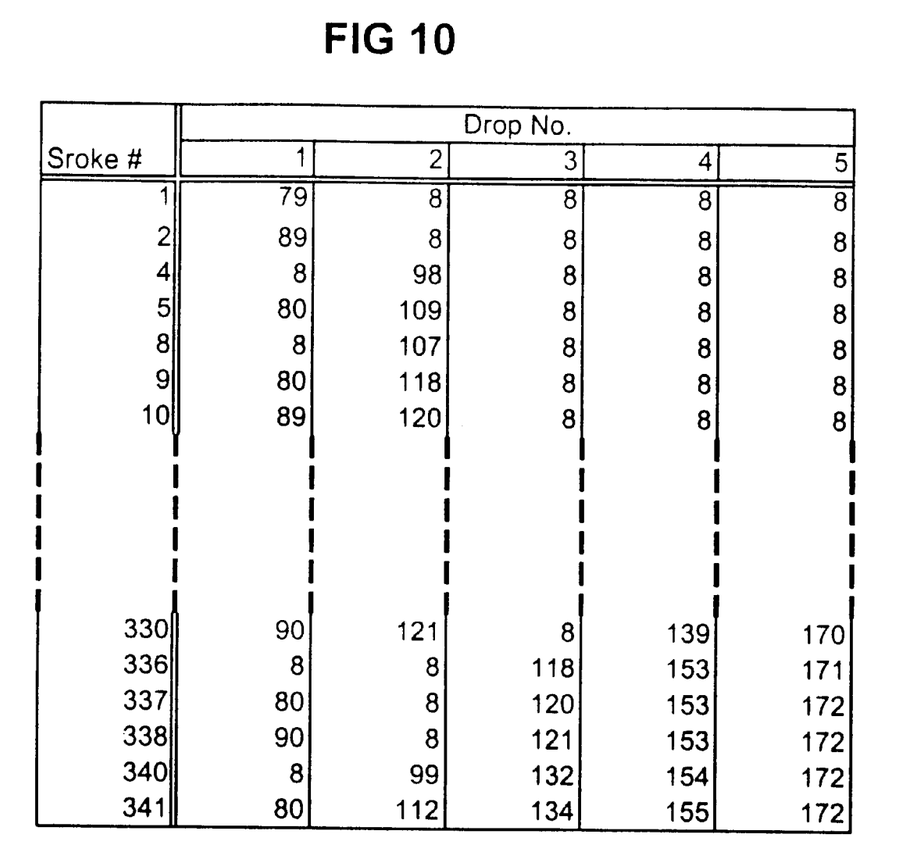
FIG. 10 is a table showing drop charge values of FIG. 9 after compensation.

Standard compensation trials are then performed to produce a table of compensated strokes as shown in FIG. 10. In the present example, the following compensated stroke might be obtained:

| 5 × 9 Mapped and compensated Example Stroke | | | | | |
| --- | --- | --- | --- | --- | --- |
| Position | 1 | 2 | 3 | 4 | 5 |
| Voltage | 80 | 8 | 120 | 153 | 172 |

Figure 11:
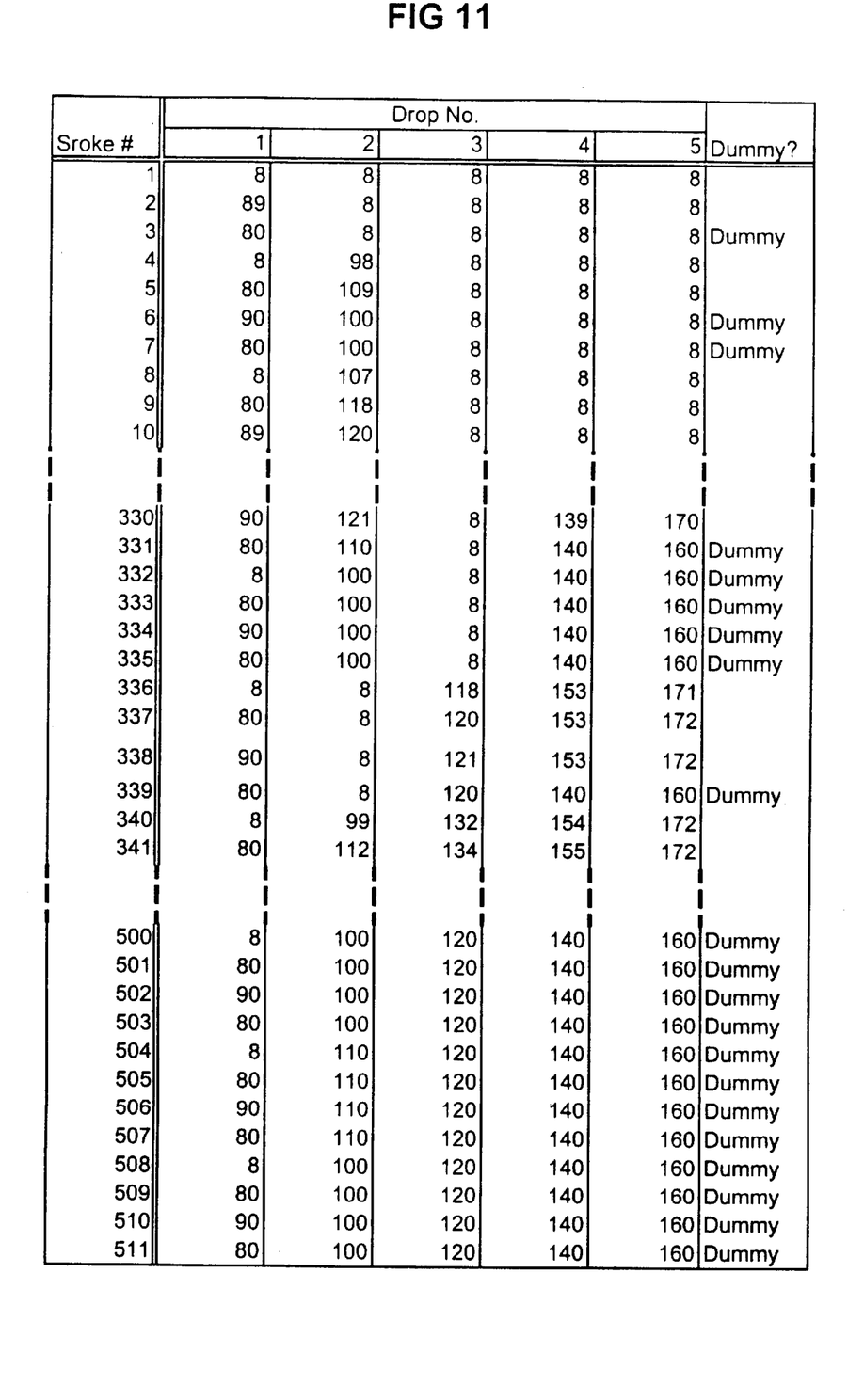
FIG. 11 is a table showing a way of storing the compensated charge values for the strokes of the example of the specific embodiment.

Fonts can be stored as sets of values representing entries in the table in FIG. 10. In this case, there are only 88 entries in the table, so a 7-bit value could be used to represent each of the entries. This is a very space efficient way of storing the fonts. Alternatively, a binary representation of the virtual stroke can be used as the key to access the associated compensated stroke. For example, consider stroke number 5 in FIG. 6. The 8's are non-print drops or 0's in the binary sequence and other charge voltages are print drops or 1's in a binary sequence. Thus, the binary sequence is 000000101, according to the convention that printing is from left to right and from least significant bit to most significant bit. A table of mappings from the binary value to the compensated stoke table could be provided. Alternatively, a table with an entry for each virtual stroke could be provided, whether or not the stroke is allowable, as shown in FIG. 11. If the software receives binary sequence 000000101 or decimal 5, it picks stroke #5 from the table in FIG. 11. For strokes which are not allowable, an appropriate dummy set of values is entered into the table. These strokes are indicated in the right hand column of the table in FIG. 11. This way, if for any reason an invalid stroke is selected for printing, rather than an error occurring, an appropriate stroke can be printed which will be similar to the stroke intended.

It should be noted that the example of n=5 and N=9 is selected arbitrarily as it is a font size generally used in the art, but any font with column height N=2n−1, such as a 5×7 font with a virtual column of height 13 would operate in precisely the same manner with the same mappings as in the above example. As discussed above, any font of size N>n, such as a 5×5 font with a virtual column height of 6 could also be used when appropriate.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What I claim is:

1. A method for printing using a continuous ink jet printer, wherein said printer projects drops toward a substrate moving in a first direction and deflects each drop in a second direction by applying a charge to said drop and passing said drop through an electric field; said method comprising the steps of:

generating a raster pattern comprising at least one column having N positions therein, of which only n of said positions are allowed to be used as active positions in such column, where N>n;

forming a stroke corresponding to each column;

charging the drops in each stroke to follow a trajectory that intercepts said substrate to mark the latter at positions corresponding to selected active positions in said column.

2. The method according to claim 1 wherein N=n+i(n−1) where i is a positive integer.

3. The method according to claim 1 wherein N=in where i is an integer greater than 1.

4. The method according to claim 1 wherein said N positions are substantially equally spaced.

5. The method according to claim 1 wherein N=2n−1.

6. The method according to claim 5 wherein two consecutive active positions in said font are separated by at least one inactive position.

7. The method according to claim 6 wherein positions 2k and 2k−1 in said column are mapped to drop number k in said stroke, where $1 \leq k \leq (n-1)/2$, and wherein position N in said column is mapped to drop number n.

8. The method according to claim 1 wherein N=2n.

9. The method according to claim 8 wherein two consecutive active positions in said font are separated by at least one inactive position.

10. The method according to claim 9 wherein positions 2k and 2k−1 of N positions in said column are mapped to drop number k in said stroke.

11. Apparatus arranged to sequentially print drops on a substrate according to a predefined raster font comprising characters with a column height N; said apparatus comprising:

means for moving said substrate in a first direction;

means for deflecting each drop in a second direction by applying a charge to said drop and passing said drop through a substantially uniform electric field;

means for forming strokes of up to n drops, at selected positions where n<N, corresponding to each column in said character; and means for charging the up to n drops in said stroke such that drops in said stroke are deflected to positions on said substrate corresponding to said selected positions in said column.

12. Apparatus according to claim 11 wherein said means for forming strokes forms strokes of n drops such that N=n+i(n−1) where i is a positive integer.

13. Apparatus according to claim 11 wherein said means for forming strokes forms strokes of n drops such that N=in where i is an integer greater than 1.

14. Apparatus according to claim 11 wherein said active positions are substantially equally spaced.

15. Apparatus according to claim 11 wherein said means for forming strokes forms strokes of n drops such that N=2n−1.

16. Apparatus according to claim 15 wherein two consecutive active positions in said font are separated by at least one inactive position.

17. Apparatus according to claim 16 wherein positions 2k and 2k−1 in said column are mapped to drop number k in said stroke, where $1 \leq k \leq (N-1)/2$, and wherein position N in said column is mapped to drop number n.

18. Apparatus according to claim 11 wherein said means for forming strokes forms strokes of n drops such that N=2n.

19. Apparatus according to claim 18 wherein two consecutive active positions in said font are separated by at least one inactive position.

20. Apparatus according to claim 19 wherein positions 2k and 2k−1 of N positions in said column are mapped to drop number k in said stroke.

\* \* \* \* \*